Patented June 30, 1942

2,288,211

UNITED STATES PATENT OFFICE 2,288,211

PROCESS FOR THE PRODUCTION OF BETA-ALKOXYALDEHYDES

Hermann Schulz, Neu-Isenburg, Frankfort-on-the-Main, Germany, assignor, by mesne assignments, to Chemical Marketing Company Inc., New York, N. Y.

No Drawing. Application May 10, 1939, Serial No. 272,850. In Germany May 19, 1938

8 Claims. (Cl. 260—602)

The present invention relates to a process for the production of beta-alkoxyaldehydes, and, more particularly, to a process for the production of beta-alkoxypropionaldehydes.

Heretofore, beta-alkoxyaldehydes have been either unobtainable or obtainable only with the greatest difficulty. As is well known in the art, when alcohols are reacted with unsaturated aldehydes, three molecules of the alcohol react with one molecule of the aldehyde to form the corresponding beta-alkoxydialkylacetal. This reaction is known to proceed extremely slowly. Although attempts have been made to produce beta-alkoxyaldehydes commercially, none, so far as I am aware, has been economically successful on an industrial scale.

It is an object of the invention to produce beta-alkoxyaldehydes easily and economically by reacting unsaturated aldehydes with alcohols to form acetals and then hydrolyze such acetals.

It is another object of the invention to produce beta-alkoxypropionaldehydes by reacting acrolein with an alcohol in the presence of water and an acidic agent.

A further object of the invention is to produce beta-ethoxypropionaldehyde by reacting acrolein with ethyl alcohol in the presence of water and an acid catalyst.

Other objects and advantages of my invention become apparent from the following description of a preferred procedure for carrying it into practice.

Generally speaking, in carrying the present invention into practice acetals are first produced from unsaturated aldehydes and alcohols in the presence of an appropriate catalyst, and the thus-formed acetals, which may be isolated if desired, are treated with aqueous acids. The alcohol groups bound as acetals are split off, but the alkoxy radical, added at the double bond of the unsaturated aldehyde, remains in combination, whereby a beta-alkoxyaldehyde is formed.

In a further modification of the present invention, alcohols are allowed to react directly and immediately with unsaturated aldehydes in the presence of water and an appropriate catalyst. Under these conditions, it is possible in a single reaction phase to direct the alcohol to the double bond, while the aldehyde group remains essentially unchanged, and thus to form a beta-alkoxyaldehyde.

It has been found that the rate of formation of the beta-alkoxyaldehydes is greatly accelerated by the presence of catalysts. In practicing my invention I have discovered that substances of acidic character make very effective catalysts. For example, mineral acids, sulfonic acids, halogenated organic acids, and acid salts of these acids have all given good results. Thus, hydrochloric acid, sulfuric acid, benzolsulfonic acid, chloroacetic acid, sodium bisulfate, zinc chloride and the like have been most successfully employed.

Within the contemplation of the present invention, acrolein, crotonaldehyde, α-methylacrolein, cinnamic aldehyde, maleic dialdehyde and the like may be considered as examples of unsaturated aldehydes. The available alcohol radicals include those of the lower alcohols of the aliphatic series, of which ethyl and methyl alcohols are particularly suitable. However, higher alcohols of the aliphatic series, such as butyl alcohol, hexyl alcohol, etc., may also be employed.

In accordance with the general principles of my invention, acrolein is mixed with ethyl alcohol in the presence of sulfuric acid and β-ethoxypropionaldehyde-diethylacetal is first obtained. This is only slightly miscible with water but when treated with a quantity of about 5% sulfuric acid, preferably at ordinary room temperatures, a complete mixing of the two liquids takes place after a short period of time, say about twenty minutes. When the mixing has taken place, it is a sign that the splitting-off of the alcohol groups bound as acetals has occurred. Occasionally, it may be advantageous to continue this hydrolysis for a longer period of time. The free β-ethoxypropionaldehyde may be recovered from this reaction mixture by fractionating, in vacuo if desired. Another method of recovery is to neutralize the major portion of the acid with strong bases, as, for example, caustic soda, agitating thoroughly, and then to neutralize the remaining acid with a basic salt, such as sodium acetate, as a buffer substance. Thereafter, the neutralized solution is subjected to azeotropic distillation in the presence of esters, hydrocarbons, etc. Other methods of recovery of the β-ethoxypropionaldehyde are to work up the reaction mixture by salting out with sodium chloride, sodium sulphate, potassium chloride or the like, or to extract with esters, ethers and the like, or to cool to low temperatures. These foregoing methods of recovery may be utilized either singly or in combination, as those skilled in the art will readily understand.

For the purpose of giving those skilled in the art a better understanding of carrying the invention into practice, the following illustrative examples are given:

Example No. I

A mixture of about 200 grams of about 94% acrolein with about 50 grams of absolute alcohol is, over the course of about 1½ hours, run into a mixture of about 300 grams of absolute alcohol with about 15 grams of about 37% hydrochloric acid. The temperature is kept at about 20° C. throughout and the liquids are thoroughly agitated. After about five hours, the addition of alcohol at the double bond of the acrolein amounts to approximately 94% of the theoretical yield, as may be determined by bromometric titration. The reaction mixture is now almost neutralized by slowly adding, with good cooling and good stirring, about 19 cc. of about 25% sodium hydroxide to leave the mixture only slightly acidic. The remaining hydrochloric acid is neutralized by the addition of a solution of about 3 grams of dry sodium acetate in about 10 cc. of water. Then the mixture is thoroughly agitated for about an hour longer. After settling, the liquid is decanted off from the precipitated salt and rectified. Distillation is carried out in an efficient column with slowly decreasing pressure, whereby alcohol is first taken off at about 100 mm., $\beta$-ethoxypropionaldehyde is recovered at about 40 mm., and the acetal comes off at about 10 mm. pressure. The following amounts are obtained:

| | |
|---|---|
| 1. At 100 mm., 35° C | 178 g. ethyl alcohol |
| | 4 g. acrolein |
| | 38 g. water |
| | 220 g. |
| 2. At 40 mm., 56° C | 41 g. $\beta$-ethoxypropionaldehyde |
| 3. At 10 mm., 70° C | 193 g. $\beta$-ethoxypropionaldehyde-diethylacetal (1,1,3-triethoxypropane) |
| 4. Residue | 9 g. |
| 5. Separated water | 16 g. |
| | 479 g. |

Yield:
41 g. of $\beta$-ethoxypropionaldehyde=71 g. of the acetal (1,1,3 triethoxypropane)
+193 g. of the acetal (1,1,3 triethoxypropane)
———
264 g. of the acetal (1,1,3 triethoxypropane)

Thus, a yield of 95% of the theoretical yield is obtained, computed for the amount of aldehydes and acetals taken together. The alcohol which contains acrolein may be used in another batch, either in its present form or after removing the water, if desired.

About 100 grams of the pure acetal is thoroughly agitated with about 200 grams of about 5% aqueous hydrochloric acid at about 20° C. After a couple of minutes these two initially immiscible liquids dissolve in each other. After about 45 minutes the saponification product recoverable amounts to about 74%, as may be determined by titration with hydroxylamine sulfate. After about 1½ hours, the amount recoverable is increased to about 92%. This is neutralized by adding about 36 cc. of about 25% sodium hydroxide and about 5 grams of anhydrous sodium acetate, accompanied by thorough stirring. From the resulting homogeneous clear solution, about 56 grams are distilled off at about 100 mm. pressure. This approximately 56 grams contains about 50 grams of ethyl alcohol, about 1.5 grams of acrolein and about 4.5 grams of water. The residue of about 243 grams is subjected to extraction with ether, and after a relatively short time all of the aldehyde is in the ether. The extract is dried with sodium sulfate and separated from the ether in any conventional manner. About 47 grams of $\beta$-ethoxypropionaldehyde are recovered, which corresponds to a yield of about 94%, when the approximately 7 grams of recovered acetal and the approximately 1½ grams of re-usable acrolein are taken into consideration. The boiling point of the $\beta$-ethoxypropionaldehyde is about 134° C. at 760 mm. and about 56° C. at 40 mm.

Example No. II

A mixture of about 100 grams of about 94% acrolein with about 50 grams of ethyl alcohol, preferably absolute, is added to a mixture of about 300 grams of ethyl alcohol, preferably absolute, with about 15 grams of about 37% hydrochloric acid. This addition is made slowly, taking about two hours therefor, and is at a temperature of about 10 to about 20° C. The mixture is stirred for about three more hours at about 20° C., and about 400 grams of about 5% hydrochloric acid is then added to it. The acetal layer, initially immiscible, disappears after about two minutes. After about two hours, about 85 cc. of about 25% sodium hydroxide and thereafter about 6 grams of anhydrous sodium acetate are added. The excess alcohol is distilled off in a rectification column at a pressure of about 100 mm., and the distillation residue is thereafter extracted. After evaporation of the extracting agent, $\beta$-ethoxypropionaldehyde and the corresponding acetal, $\beta$-ethoxypropionaldehyde-diethylacetal, are obtained in the mol relationship of about 4:1 with a total yield of aldehyde and acetal of about 90 to about 93% of the theoretical yield, as based upon the acrolein. The $\beta$-ethoxypropionaldehyde-diethylacetal may either be saponified to form $\beta$-ethoxypropionaldehyde in accordance with Example No. I with aqueous hydrochloric acid or may be added to a new batch.

Example No. III

About 100 grams of about 94% acrolein is added to a mixture of about 200 grams of ethyl alcohol, preferably absolute, and about 200 grams of about 5% hydrochloric acid and the temperature is maintained at about 20° C. After about twenty-four hours, about 95% of the acrolein has disappeared, as may be readily determined bromometrically by the absence of the double bond, whereas about 79% of $\beta$-ethoxypropionaldehyde, together with about 18% of $\beta$-ethoxypropionaldehyde-diethylacetal, have been formed. Thereafter the mixture is neutralized with about 34 cc. of about 25% sodium hydroxide and about 3 grams of anhydrous sodium acetate. The excess alcohol is distilled off at about 100 mm. pressure in a good rectification column at a distillation temperature of about 35 to about 36° C., and the residue is subjected to extraction. The extraction agent, whether it is diethyl ether, ethyl acetate, or the like, readily takes up the reaction products. When the extraction agent has been removed in any conventional manner, there remains, for the most part, $\beta$-ethoxypropionaldehyde and its acetal, $\beta$-ethoxypropionaldehyde-diethylacetal, which may easily be separated by rectification. Here, too, the aldehyde and its acetal occur in the mol relationship of about 4:1 and have been produced with a yield of about 85 to about 90% of the theoretical yield, based upon the acrolein. Here, as in Example No. I, the $\beta$-ethoxypropionaldehyde-diethylacetal may either be saponified or may be added to a new batch.

Although my invention has been described in connection with preferred embodiments, it will be observed that variations may be resorted to and are within the purview of the appended claims. In the foregoing illustrative examples, the production of beta-ethoxypropionaldehyde was described. Of course, other beta-alkoxyaldehydes can be produced by the following reactions and will have the following structural formula:

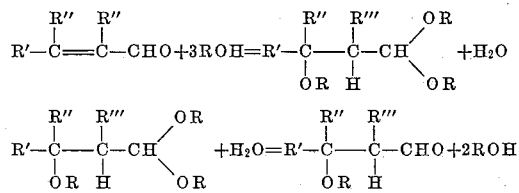

wherein R is an alkyl group and R', R'', and R''' are hydrogen atoms or organic radicals. Thus, beta-alkoxyaldehydes can be manufactured from any unsaturated aldehyde having an unsaturated carbon in the beta position by reacting said aldehyde with an alcohol. Among the unsaturated aldehydes, besides acrolein, may be mentioned the following: crotonaldehyde, which yields a product wherein R' is a methyl group and R'' and R''' are hydrogen atoms; cinnamic aldehyde, which yields a product wherein R' is a phenyl group, and R'' and R''' are hydrogen atoms; and alpha-methyl acrolein, which yields a product wherein R'' is a methyl group, and R' and R''' are hydrogen atoms. Among the alcohols, besides ethyl alcohol, may be mentioned: methyl alcohol, propyl alcohol, isopropyl alcohol, butyl alcohol, isobutyl alcohol and amyl alcohol.

I claim:

1. In the process for producing β-ethoxypropionaldehyde which comprises reacting acrolein with ethyl alcohol to form a solution containing β-ethoxypropionaldehyde and β-ethoxypropionaldehyde-diethylacetal, hydrolyzing, and separating said β-ethoxypropionaldehyde from said β-ethoxypropionaldehyde-diethyl-acetal, the improvement which comprises slowly adding acrolein of about 94% to about twice its weight of ethyl alcohol and to about twice its weight of about 5% hydrochloric acid at about 20° C., and thereafter allowing the same to remain in intimate contact for not longer than about 24 hours.

2. In the process for producing β-ethoxypropionaldehyde which comprises reacting acrolein with ethyl alcohol to form β-ethoxypropionaldehyde-diethyl-acetal, hydrolyzing with hydrochloric acid to form β-ethoxypropionaldehyde, neutralizing with sodium hydroxide and sodium acetate, distilling off excess alcohol to leave a distillation residue, extracting said distillation residue with an extraction agent, evaporating off said extraction agent to leave a solution containing said β-ethoxypropionaldehyde, and recovering said β-ethoxypropionaldehyde by rectification, the improvement which comprises adding a mixture of acrolein of about 94% with about half its weight of ethyl alcohol to a mixture of about 3 times said acrolein-weight of ethyl alcohol with about 15% of said acrolein-weight of about 37% hydrochloric acid over a period of not longer than about 2 hours at a temperature of from about 10 to about 20° C., and agitating the same for not longer than about 3 hours at about 20° C.

3. A process for producing beta-ethoxy propional which comprises slowly mixing about 100 parts of about 94% acrolein with about 350 parts of ethyl alcohol containing about 15 parts of about 37% hydrochloric acid during a period of not more than about 2 hours and at a temperature of about 10 to about 20° C. to obtain a reaction mixture having an acid concentration of about 1.2%, stirring said reaction mixture for not more than about 3 hours at about 10° to about 20° C., adding about 400 parts of an about 5% aqueous hydrochloric acid solution to obtain a hydrolyzing mixture having an acid concentration of at least about 3%, reacting said hydrolyzing mixture for not more than about 2 more hours to obtain a hydrolyzed reaction mixture containing beta-ethoxy propional and beta-ethoxy propional diethyl acetal in the mol ratio of about 4:1, adding about 108 parts of about 25% sodium hydroxide solution and about 6 parts anhydrous sodium acetate, removing excess alcohol to leave an extraction residue, extracting said extraction residue with a solvent for beta-ethoxy propional and beta-ethoxy propional diethyl acetal to obtain a solution containing beta-ethoxy propional and beta-ethoxy propional diethyl acetal and a solvent-insoluble residue, and then separating said beta-ethoxy propional from said beta-ethoxy propional diethyl acetal.

4. A process for producing beta-ethoxy propional and beta-ethoxy propional diethyl acetal which comprises reacting about 100 parts of about 94% acrolein with about 200 parts of ethyl alcohol and about 200 parts of an about 5% aqueous hydrochloric acid solution at a temperature of about 10° to about 20° C. for not more than about 24 hours in a reaction mixture having an acid concentration of at least about 2% whereby beta-ethoxy propional and beta-ethoxy propional diethyl acetal are formed in a mol ratio of about 4:1, adding about 43 parts of an about 25% sodium hydroxide solution and about 3 parts anhydrous sodium acetate, removing excess alcohol to leave a residue containing the aforesaid beta-ethoxy propional and the aforesaid beta-ethoxy propional diethyl acetal, extracting said residue with a solvent for said beta-ethoxy propional and said beta-ethoxy propional diethyl acetal to obtain a solution containing the aforesaid beta-ethoxy propional and the aforesaid beta-ethoxy propional diethyl acetal and a solvent-insoluble residue, and then separating said beta-ethoxy propional from said beta-ethoxy propional diethyl acetal.

5. A process for producing beta-alkoxy propional and beta-alkoxy alpha-methyl propional which comprises reacting an unsaturated aldehyde selected from the group consisting of acrolein and alpha-methyl acrolein with an aliphatic alcohol having not more than 6 carbon atoms in the molecule in the ratio of 1 part of aldehyde to about 1 to about 4 parts of said alcohol in the presence of water and of at least 5% of an acidic catalyst calculated on the weight of said unsaturated aldehyde for a period of time not greater than about 24 hours at a temperature of about 10° to about 20° C. to obtain a mixture containing beta-alkoxy derivative of said unsaturated aldehyde and beta-alkoxy dialkyl acetal of said unsaturated aldehyde in the mol ratio of about 4:1, adding a quantity of alkali hydroxide and alkaline buffer salt to neutralize said reaction mixture, removing excess alcohol to leave a residue containing the aforesaid beta-alkoxy derivative and said beta-alkoxy dialkyl acetal, extracting said residue with a solvent for said beta-alkoxy derivative and said beta-alkoxy dialkyl acetal to obtain a solution containing said beta-alkoxy derivative and said beta-alkoxy dialkyl acetal and a solvent-insoluble residue, separating said solution from said solvent-insoluble residue, removing said solvent, and then separating said beta-alkoxy derivative.

6. A process for producing beta-alkoxy propional and beta-alkoxy alpha-methyl propional which comprises mixing an unsaturated aldehyde selected from the group consisting of acrolein and alpha-methyl acrolein with an aliphatic alcohol having not more than 6 carbon atoms in the molecule in the ratio of 1 part of aldehyde to about 1 to about 4 parts of said alcohol in the presence of water and of a quantity of concentrated hydrochloric acid amounting to about 15% of the weight of said unsaturated aldehyde during not more than about 2 hours and at a temperature of about 10° to about 20° C. to obtain a reaction mixture, stirring said reaction mixture at about 20° C., for not more than about three more hours to obtain a reaction mixture containing beta-alkoxy dialkyl acetal of said unsaturated aldehyde, adding a quantity of dilute hydrochloric acid which is about 20% of the weight of said unsaturated aldehyde and to provide a total quantity of acidic catalyst amounting to about 25% of the weight of said unsaturated aldehyde, hydrolyzing said reaction mixture in the presence of said acidic catalyst for not more than an additional 2 hours to obtain a reaction mixture containing beta-alkoxy derivative of said unsaturated aldehyde and beta-alkoxy dialkyl acetal of said unsaturated aldehyde, adding a quantity of sodium hydroxide and alkaline buffer salt sufficient to neutralize said reaction mixture, removing excess alcohol from said reaction mixture, extracting said residue with a solvent to obtain a solution containing said beta-alkoxy derivative and said beta-alkoxy dialkyl acetal and a solvent-insoluble residue, separating said solution containing said beta-alkoxy derivative and said beta-alkoxy dialkyl acetal from said solvent-insoluble residue and then separating said beta-alkoxy derivative of said unsaturated aldehyde.

7. A process for producing beta-alkoxy propional and beta-alkoxy alpha-methyl propional which comprises reacting an unsaturated aldehyde selected from the group consisting of acrolein and alpha-methyl acrolein with an aliphatic alcohol having not more than 6 carbon atoms in the molecule in the ratio of 1 part of aldehyde to about 1 to about 4 parts of said alcohol in the presence of water and a quantity of 5% hydrochloric acid sufficient to provide about 10% hydrochloric acid based on the weight of said unsaturated aldehyde for a period of time not greater than about 24 hours at a temperature of about 10° to about 20° C. to obtain a reaction mixture containing beta-alkoxy derivative of said unsaturated aldehyde and beta-alkoxy dialkyl acetal of said unsaturated aldehyde in the mol ratio of about 4:1, adding a quantity of alkali hydroxide and alkaline buffer salt to neutralize said reaction mixture, removing excess alcohol to leave a distillation residue containing the aforesaid beta-alkoxy derivative and the aforesaid beta-alkoxy dialkyl acetal, extracting said distillation residue with a solvent to obtain a solution containing said beta-alkoxy derivative and said beta-alkoxy dialkyl acetal and a solvent-insoluble residue, separating said solution from said solvent-insoluble residue, removing said solvent and then separating said beta-alkoxy derivative from said beta-alkoxy dialkyl acetal.

8. In the process of producing beta-alkoxyaldehydes and beta-alkoxyaldehyde dialkyl acetals from acrolein and alpha-methyl acrolein which involves reacting an unsaturated aldehyde selected from the group consisting of acrolein and alpha-methyl acrolein with an aliphatic alcohol containing not more than 6 carbon atoms in the presence of water and of an acidic catalyst at room temperature, the step which comprises employing sufficient of an acidic catalyst in the hydrolyzing mixture of beta-alkoxy derivative and beta-alkoxy dialkyl acetal to provide a concentration of about 2% to about 3% acid in said hydrolyzing mixture and limiting the total time of reaction to not more than about 24 hours whereby beta-alkoxy derivative and beta-alkoxy dialkyl acetal of said unsaturated aldehyde are obtained in a mol ratio of about 4:1.

HERMANN SCHULZ.